UNITED STATES PATENT OFFICE.

HENRY S. BLACKMORE, OF MOUNT VERNON, NEW YORK.

PROCESS OF MAKING CARBON CHLORIDS, &c.

No. 889,573.   Specification of Letters Patent.   Patented June 2, 1908.

Application filed January 12, 1903. Serial No. 138,737.

*To all whom it may concern:*

Be it known that I, HENRY S. BLACKMORE, a citizen of the United States, residing at Mount Vernon, in the county of Westchester and State of New York, have invented certain new and useful Improvements in Processes of Making Carbon Chlorids and other Carbon Halids; and I do hereby declare the following to be a full, clear, and exact description of the invention, such as will enable others skilled in the art to which it appertains to make and use the same.

The object of my invention is to make carbon chlorids, such as carbon tetrachlorid and other carbon halids, and consists in generating chlorin or other halogen in the presence of carbon or carbon-yielding substances whereby the nascent chlorin or other halogen unites directly with the carbon, forming carbon chlorids or other carbon halids which are finally condensed or collected in any manner well known to chemists.

My invention relates particularly to the direct formation of compounds of chlorin and carbon which are brought about by an exothermic reaction employing an endothermic carbid such as acetylene (hydrogen carbid), calcium carbid, or other metallic carbid, the electro-positive element or base of which is removed by the excess of chlorin, oxygen or other combining element present, and chlorin which is generated in the presence of said endothermic carbid or carbon which, heated to a combining degree, either externally or by the heat of reaction, the temperature of the reacting ingredients being maintained below the dissociating point of the carbon chlorid desired preferably by refrigeration but is not confined to this operation as the heat required may be wholly supplied externally to produce the reaction and the temperature regulated and maintained below the dissociating point of the carbon chlorid by any convenient means.

In carrying out my invention for the production of carbon chlorid I prefer to proceed as follows: I take a mixture of calcium hypochlorite $Ca(ClO)_2$ (bleaching powder) and calcium carbid $CaC_2$ in a powdered and thoroughly mixed condition and in proportion of about 36 pounds of the former to 6 pounds of the latter and place it in a proper receptacle communicating with a condenser. I then convey into the receptacle hydrochloric acid gas whereupon a reaction occurs generating carbon tetrachlorid which is vaporized by the heat liberated during reaction, distilled off and is finally condensed in any convenient manner. This reaction which takes place may be illustrated by the following chemical formula or equation:

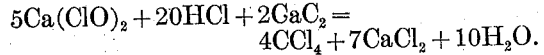

$$5Ca(ClO)_2 + 20HCl + 2CaC_2 = 4CCl_4 + 7CaCl_2 + 10H_2O.$$

Care must be taken not to introduce the hydrochloric acid gas into contact with the mixture of calcium hypochlorite and calcium carbid too rapidly, otherwise the heat will accumulate suddenly to a point at which the formation of carbon tetrachlorid is precluded and also the danger of explosion from the too rapid generation of carbon chlorid vapors or an excess of acetylene is avoided.

I find it of advantage to introduce together with the hydrochloric acid gas a gas of inert nature such as nitrogen which can be cooled prior to introduction or can be employed in such volume that it will absorb the excess heat liberated during reaction thereby acting as a refrigerant to maintain the temperature below the dissociating point of the carbon chlorids desired.

The essential feature of my process is the formation of carbon chlorids by subjecting carbon or carbon-yielding compounds to the action of nascent chlorin or exposing the carbon or carbon-yielding substance to the action of a chlorin-yielding compound or composition at a reacting temperature.

Instead of mixing with the calcium hypochlorite a solid carbid such as calcium carbid I can convey in contact with the hypochlorite a mixture of a gaseous or vaporized hydrocarbon with gaseous hydrochloric acid whereupon the liberation of chlorin and carbon is effected simultaneously by the oxidation of the hydrogen content of the hydrochloric acid and hydrocarbon with simultaneous deoxidation of the hypochlorite, the chlorin and carbon thus liberated uniting in their nascent condition to form carbon chlorids; the chemical reaction which takes place under these conditions during the performance of my process may be illustrated by the following chemical formula or equation which sets forth the formation of carbon chlorids by the oxidation of the hydrogen content of hydrochloric acid and acetylene:

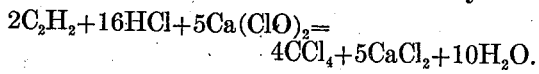

It is obvious that the temperature of the reacting ingredients must be maintained at a point at which the oxygen has an affinity for the hydrogen of the composition in preference to carbon which is found to be preferably at a low red heat and any other oxidizing agent instead of calcium hypochlorite may be employed to oxidize the hydrogen content of the composition or free oxygen may be employed provided, as aforesaid, the temperature is maintained at a point at which the hydrogen has an affinity for the oxygen in preference to carbon. When employing free oxygen the reaction may be simply illustrated by the following chemical formula or equation:

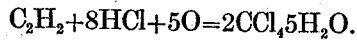

I do not desire to confine myself to the production of carbon chlorids by exposing carbon or carbon-yielding substances to the action of nascent chlorin generated in the preferable manner as hereinbefore described, viz., the formation of chlorin by the action of hydrochloric acid on calcium hypochlorite, but reserve the right to produce the chlorin in any convenient manner so long as it is generated in the presence of the carbon or carbon-yielding substance with which the nascent chlorin may readily combine without danger of dissociation.

While I consider it of great advantage to employ as carbon-yielding substances carbids of endothermic nature, such as acetylene, calcium carbid, or other metallic carbids so that the process may be carried on continuously by the heat liberated during reaction, still, I can employ such carbon or carbon-yielding substances as are capable of uniting with nascent chlorin to produce carbon chlorids which require the employment of extraneous heat to perform and maintain the reaction which can either be supplied by external heat generating means or electrical resistance without departing from the spirit of my invention which consists in exposing carbon or carbon-yielding substances to the action of nascent chlorin as before set forth.

The carbon or carbon-yielding substances which I employ I prefer to designate in this specification and claims by the general term "carbonaceous substance"; this term is intended to include carbon *per se* or substances capable of yielding or liberating carbon either by chemical decomposition or physical dissociation, in the former case, such as the liberation of carbon from acetylene or calcium carbid by the combination of chlorin, oxygen or other combining agent with the hydrogen of the acetylene, calcium of the calcium carbid or other base of the carbid employed, or, in the latter case, the physical dissociation of acetylene by the action of heat into free carbon such as is known by the term "cracking."

I also do not desire to confine myself to the performance of the direct reaction between nascent chlorin and free carbon but desire to include all modifications which may justly come within the scope of my invention such as the performance of the reaction in a fused condition or dissolved or suspended in inert fluid which inert substances may be designated as those which do not interfere with the formation or separation of the carbon chlorids desired; or simultaneously generating chlorin and carbon or carbon-yielding substances in the presence of a reacting fluid; or introducing into contact with a chlorin-generating composition carbon or carbon-yielding substances continuously or from time to time as desired; or exposing the carbon or carbon-yielding substance to the action of nascent chlorin in any practical manner so long as the temperature is so regulated and maintained by refrigeration or otherwise at a point at which the electropositive element or base of the carbon-yielding compound has an affinity for the negative decomposing agent employed in preference to carbon and is below the dissociating point of the carbon chlorid desired.

The term "carbid" employed in this specification and claims relates to any combination of carbon with an element, such as a metal or metals, be it a normal carbid, an acetylid or any union or combination which may be considered the equivalent of the same, and is intended to include hydrogen carbids (hydrocarbons) as well as calcium carbid or other metal carbids, hydrogen being taken as a metal which exists in gaseous form at ordinary temperature and pressure, the carbid of which may be justly termed, and is herein intended to include the hydrogen carbids (hydrocarbons), as well as metal or other carbids. The hydrogen carbids employed may be either in solid, liquid, or gaseous form.

As an illustration of the hydrocarbons which can be employed and the conditions under which applied I would mention as a permanent gas, acetylene, or, in vaporized condition, naphthalene, petroleum, etc., or, in solid form, bituminous coal or similar dense hydrocarbon.

As a compound or composition from which chlorin is evolved or generated in the presence of carbon or carbon-yielding substances I prefer to employ hydrogen chlorid (hydrochloric acid gas) the chlorin from which is liberated by oxidation of the hydrogen content but I do not confine myself to the employment of hydrogen chlorid as any other chlorid or chlorin compound may be employed from which the chlorin may be evolved in contact with the carbon or carbon-yielding compound by any convenient means, such as the decomposition of calcium chlorid and calcium hypochlorite by the action of silica and heat, thus:

$$CaCl_2 + Ca(ClO)_2 + 2SiO_2 = 2CaSiO_3 + 4Cl.$$

The term "oxidizing agent" which is employed herein refers to any compound which will combine with the electro-positive element or elements of the chlorin composition, the electro-positive constituents of the carbonaceous substance, or both, and may be either a compound from which the oxygen may be derived during reaction or oxygen mixed with other substances such as ordinary air or oxygen *per se*. The terms "carbon chlorid" and "carbon halid" employed in this specification and claims relate to any combination of carbon with chlorin or other halogen be it the tetrachlorid, tetrahalid, or any other suitable chlorin or halogen compound of carbon.

While my process relates particularly to the formation of chlorin compounds of carbon, still I do not desire to confine myself to the production of these particular compounds by my process but reserve the right to produce any other carbon halid, such as carbon bromids, carbon fluorids, or carbon iodids with the substitution of bromin, fluorin or iodin-generating or yielding compositions in place of those employed for generating chlorin in accordance with my process as aforesaid, the carbon halids produced being vaporized and condensed or secured, after formation, in any convenient manner. I have also found it advantageous to subject the halogen generated to the action of an electric current whereby the said halogen becomes energized or rendered more active and its union with the carbon facilitated and the employment of halogen thus energized and rendered active by the action of an electric current I desire to include as an important feature of my invention.

It is obvious that I can produce any other carbon halid, such as carbon tetrabromid, carbon tetrafluorid, or carbon tetraiodid by exposing carbon or carbon-yielding substances to the action of a halogen composition without departing from the spirit of my invention.

Instead of simultaneously liberating in contact with each other the carbon from carbon-containing compounds and chlorin from compositions containing chlorin, I can employ the carbon in a free state and generate the chlorin in contact with it without departing from the spirit of my invention which consists in generating chlorin or other halogen in the presence of carbon or carbon-yielding substances under conditions which admit of their union to form carbon halids.

When carrying out this modification of my process I employ a mass of porous carbon, such as charcoal, preferably in a pulverized condition and pass a current of electricity through the same. I then supply to the carbon during the passage of electricity therethrough, molten calcium chlorid. As this calcium chlorid passes through the pulverulent and porous charcoal it is disrupted by the action of the electric current producing calcium carbid and carbon tetrachlorid. The reaction which takes place may be illustrated by the following chemical formula or equation:

$$2CaCl_2 + 5C = 2CaC_2 + CCl_4.$$

This process can be carried on continuously by supplying calcium chlorid and pulverized charcoal from time to time while maintaining the passage of an electric current through the mass and withdrawing the calcium carbid produced, the carbon tetrachlorid which is produced by the action of nascent chlorin thus generated on the powdered or porous charcoal passing off as vapor and being condensed and collected in any convenient manner. Any other metallic halid may be substituted for the calcium chlorid in which case the corresponding carbon halids will be evolved instead of carbon tetrachlorid.

The reactions which take place between the ingredients in carrying out my process as hereinbefore set forth are induced and maintained either by heat applied from an external source or liberated within the mass by the decomposition or transformation of endothermic compounds or by electrical resistance, the excess of heat being abstracted from the ingredients to maintain the temperature below the dissociating point of the carbon halid desired by refrigeration or other convenient means.

Having now described my invention, what I claim as new and desire to secure by Letters Patent is:—

1. The process of making carbon halids which consists in exposing a carbonaceous substance to the action of halogen-generating composition under reacting conditions.

2. The process of making carbon halids which consists in exposing a carbid to the action of a halogen generating composition under reacting conditions.

3. The process of making carbon halids which consists in exposing a metallic carbid to the action of a halogen-generating composition under reacting conditions.

4. The process of making carbon halids which consists in exposing hydrogen carbid to the action of a halogen-generating composition under reacting conditions.

5. The process of making carbon halids which consists in exposing acetylene to the action of halogen generating composition under reacting conditions and maintaining the temperature below the dissociating point of the carbon halid desired.

6. The process of making carbon halids which consists in exposing a carbonaceous substance and a halogen-generating composition to the action of an electric current capable of producing heat sufficient to induce reaction and maintaining the temperature of the reacting ingredients below the dissociating point of the carbon halid desired.

7. The process of making carbon halids which consists in passing a current of electricity through a composition containing a carbonaceous substance and a halogen generating compound until a reaction has been induced between the ingredients of the substance, maintaining the temperature of the reacting ingredients below the dissociating point of the carbon halid desired and collecting and condensing the vapors evolved during reaction.

8. The process of making carbon chlorid which consists in exposing a carbonaceous substance to the action of a chlorin generating composition.

9. The process of making carbon chlorid which consists in exposing a carbonaceous substance to the action of nascent chlorin.

10. The process of making carbon chlorid which consists in exposing a carbonaceous substance to the action of nascent chlorin while maintaining the temperature below the dissociating point of the carbon chlorid desired.

11. The process of making carbon chlorid which consists in exposing a carbonaceous substance to the action of nascent chlorin while maintaining the temperature below the dissociating point of the carbon chlorid desired by refrigeration.

12. The process of making carbon chlorid which consists in displacing chlorin from a composition containing chlorin in the presence of a carbonaceous substance which carbonaceous substance is capable of uniting or combining with the chlorin thus displaced.

13. The process of making carbon chlorid which consists in exposing a carbonaceous substance and a chlorid to the action of an oxidizing agent at a temperature at which the oxygen of the oxidizing agent has an affinity for the electro-positive element of the chlorid in preference to carbon.

14. The process of making carbon chlorid which consists in exposing a carbonaceous substance and hydrogen chlorid to the action of an oxidizing agent at a temperature at which the oxygen of the oxidizing agent has an affinity for hydrogen in preference to carbon.

15. The process of making carbon chlorid which consists in exposing a carbonaceous substance and hydrogen chlorid to the action of oxygen while maintaining the temperature at a point at which oxygen has an affinity for the electro-positive constituents of the composition in preference to carbon.

16. The process of making carbon chlorid which consists in exposing a carbid to the action of a chlorin-generating composition.

17. The process of making carbon chlorid which consists in exposing a carbid and a chlorid to the action of an oxidizing agent at a temperature at which the oxygen of the oxidizing agent has an affinity for the electro-positive element of the composition in preference to carbon.

18. The process of making carbon chlorid which consists in exposing a carbid and a compound containing chlorin to the action of a substance capable of simultaneously displacing carbon and chlorin whereby they unite concurrently by mutual contact.

19. The process of making carbon chlorid which consists in exposing a carbid and hydrogen chlorid to the action of an oxidizing agent at a temperature at which the oxygen of the oxidizing agent has an affinity for the electro-positive element of the composition in preference to carbon.

20. The process of making carbon chlorid which consists in exposing a carbid and hydrogen chlorid to the action of oxygen at a temperature at which the oxygen has an affinity for the electro-positive constituents of the composition in preference to carbon.

21. The process of making carbon chlorid which consists in exposing a metal carbid to the action of a chlorin-generating composition.

22. The process of making carbon chlorid which consists in exposing a metal carbid and a chlorid to the action of an oxidizing agent at a temperature at which the oxygen of the oxidizing agent has an affinity for the electro-positive element of the composition in preference to carbon.

23. The process of making carbon chlorid which consists in exposing a metal carbid and hydrogen chlorid to the action of an oxidizing agent at a temperature at which the oxygen of the oxidizing agent has an affinity for the electro-positive element of the composition in preference to carbon.

24. The process of making carbon chlorid which consists in exposing a metal carbid and hydrogen chlorid to the action of oxygen while maintaining the temperature at a point at which the oxygen has an affinity for the electro-positive constituent in preference to carbon.

25. The process of making carbon chlorid which consists in exposing acetylene to the action of a chlorin generating composition.

26. The process of making carbon chlorid which consists in exposing a composition containing a metal carbid and a chlorid to the action of a substance capable of uniting with the electro-positive constituents of the composition, whereby the displaced carbon and chlorid concurrently unite by mutual contact.

27. The process of making carbon chlorid which consists in exposing hydrogen carbid and a chlorid to the action of an oxidizing agent at a temperature at which the oxygen of the oxidizing agent has an affinity for the electro-positive element of the composition in preference to carbon.

28. The process of making carbon chlorid which consists in exposing hydrogen carbid and hydrogen chlorid to the action of an oxidizing agent at a temperature at which the oxygen of the oxidizing agent has an affinity for hydrogen in preference to carbon.

29. The process of making carbon chlorid which consists in exposing a hydrogen carbid and hydrogen chlorid to the action of oxygen while maintaining the temperature at a point at which oxygen has an affinity for the electro-positive constituents of the composition in preference to carbon.

30. The process of making carbon chlorid which consists in exposing a hydrogen carbid and a chlorid to the action of a substance capable of uniting with the electro-positive constituents of the composition whereby the displaced carbon and chlorin concurrently unite by mutual contact.

31. The process of making carbon chlorid which consists in exposing acetylene and a chlorid to the action of a substance capable of uniting with the electro-positive constituents of the composition whereby the displaced carbon and chlorin concurrently unite by mutual contact.

32. The process of making carbon chlorid which consists in exposing acetylene and a chlorid to the action of an oxidizing agent at a temperature at which the oxygen of the oxidizing agent has an affinity for the electro-positive elements of the composition in preference to carbon.

33. The process of making carbon chlorid which consists in exposing acetylene and hydrogen chlorid to the action of an oxidizing agent at a temperature at which the oxygen of the oxidizing agent has an affinity for hydrogen in preference to carbon.

34. The process of making carbon chlorid which consists in exposing acetylene and hydrogen chlorid to the action of oxygen while maintaining the temperature at a point at which the oxygen has an affinity for the hydrogen of the composition in preference to carbon.

35. The process of making carbon chlorid which consists in exposing an endothermic carbid and a chlorid to the action of a chlorin generating composition.

36. The process of making carbon chlorid which consists in exposing an endothermic carbid and a chlorid to the action of an oxidizing agent at a temperature at which the oxygen of the oxidizing agent has an affinity for the electro-positive element of the composition in preference to carbon.

37. The process of making carbon chlorid which consists in exposing an endothermic carbid and hydrogen chlorid to the action of oxygen while maintaining the temperature at a point at which the oxygen has an affinity for the electro-positive constituents of the composition in preference to carbon.

38. The process of making carbon chlorid which consists in exposing an endothermic carbid and a chlorid to the action of a substance capable of simultaneously displacing the carbon and chlorin whereby they unite concurrently by mutual contact.

In testimony whereof I affix my signature, in presence of two witnesses.

HENRY S. BLACKMORE.

Witnesses:
H. N. JENKINS,
C. C. WRIGHT.